United States Patent
Konji

(10) Patent No.: US 10,827,540 B2
(45) Date of Patent: Nov. 3, 2020

(54) COMMUNICATION APPARATUS THAT CAN COMMUNICATE WITH A DEVICE PROVIDED WITH AN ACCESS POINT, AND CONTROL METHOD THEREFOR

(71) Applicant: CANON KABUSHIKI KAISHA, Tokyo (JP)

(72) Inventor: Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 15/186,305

(22) Filed: Jun. 17, 2016

(65) Prior Publication Data

US 2016/0381722 A1    Dec. 29, 2016

(30) Foreign Application Priority Data

Jun. 23, 2015 (JP) .................................. 2015-125883

(51) Int. Cl.
| | |
|---|---|
| *H04W 76/11* | (2018.01) |
| *H04W 76/14* | (2018.01) |
| *H04W 4/80* | (2018.01) |
| *H04W 76/18* | (2018.01) |
| *H04W 8/00* | (2009.01) |
| *H04L 29/12* | (2006.01) |

(52) U.S. Cl.
CPC ............. *H04W 76/11* (2018.02); *H04W 4/80* (2018.02); *H04W 76/14* (2018.02); *H04W 76/18* (2018.02); *H04L 61/6022* (2013.01); *H04W 8/005* (2013.01)

(58) Field of Classification Search
CPC .............................. H04W 76/23; H04W 8/005
See application file for complete search history.

(56) References Cited

U.S. PATENT DOCUMENTS

| | | | | |
|---|---|---|---|---|
| 2013/0148161 A1* | 6/2013 | Park | ....................... | G06F 3/1296 358/1.15 |
| 2014/0351444 A1* | 11/2014 | Qi | ......................... | H04W 76/11 709/227 |

FOREIGN PATENT DOCUMENTS

| | | |
|---|---|---|
| CN | 101179459 A | 5/2008 |
| CN | 101300793 A | 11/2008 |
| CN | 103716903 A | 4/2014 |
| JP | 4986515 B2 | 7/2012 |

* cited by examiner

*Primary Examiner* — Kodzovi Acolatse
*Assistant Examiner* — Farhad Ali
(74) *Attorney, Agent, or Firm* — Canon U.S.A., Inc., IP Division

(57) ABSTRACT

Identification information for identifying a device is obtained from the device, and processing is executed such that where the obtained identification information and access point information related to an access point the communication apparatus is already connected satisfy a predetermined condition a communication apparatus is not connected to the device by a first connection method where the communication apparatus is directly connected to the device on a peer-to-peer basis.

23 Claims, 14 Drawing Sheets

| CURRENT DISPLAY SCREEN | PRINTER REGISTRATION METHOD | CONNECTION MAINTAINING NETWORK TYPE |
|---|---|---|
| PRINTER SEARCH SCREEN | – | INFRASTRUCTURE MODE |
| OTHER THAN PRINTER SEARCH SCREEN | PRINTER UNREGISTERED | INFRASTRUCTURE MODE |
| | INFRASTRUCTURE MODE | INFRASTRUCTURE MODE |
| | Wi-Fi DIRECT | Wi-Fi DIRECT |

COMMUNICATION APPARATUS THAT CAN COMMUNICATE WITH A DEVICE PROVIDED WITH AN ACCESS POINT, AND CONTROL METHOD THEREFOR

BACKGROUND

Field

Aspects of the present invention generally relate to a communication apparatus that communicates with a device provided with an access point and can directly connect to the device or connect to the access point provided to the device.

Description of the Related Art

In recent years, a connection method for a network in which a communication can be established in a terminal apparatus and a printing apparatus has been diversified. However, when the connection method has been diversified, despite a situation where a network connection based on a certain connection method has been established, in some cases, a network connection based on a different connection method may be established. This results in a redundant connection state, and unnecessary costs for the connections may be charged or an unstable communication state may occur.

Japanese Patent No. 4986515 discloses a method of setting a restriction related to a network connection with respect to each of a plurality of network identifiers.

However, according to the technology described in Japanese Patent No. 4986515, a uniquely determined restriction is imposed with respect to the network identifier. For this reason, irrespective of the connection to the device based on a certain connection method, the connection based on the other connection method is controlled.

SUMMARY OF THE INVENTION

To address the above-described issue, a control method for a communication apparatus according to an aspect of the present invention is as follows.

A control method for a communication apparatus that communicates with a device including an access point and connects to the device using a first connection method where the communication apparatus is directly connected to the device on a peer-to-peer basis or a second connection method different from the first connection method and where the communication apparatus is connected to the access point included in the device includes obtaining, from the device, identification information for identifying the device, and executing processing such that, in a case where the obtained identification information and access point information related to the access point the communication apparatus is already connected to satisfy a predetermined condition, the communication apparatus is not connected to the device by the first connection method and that, in a case where the predetermined condition is not satisfied, the communication apparatus is connected to the device by the first connection method, wherein the predetermined condition is satisfied in a case where the communication apparatus is already connected to the device via the access point by the second connection method.

Further features of aspects of the present invention will become apparent from the following description of exemplary embodiments with reference to the attached drawings.

DESCRIPTION OF THE EMBODIMENTS

Hereinafter, exemplary embodiments of the present invention will be described in detail with reference to the accompanying drawings. It should be noted that the following exemplary embodiments are not limited to the aspects of the present invention within the scope of claims, and also not all combinations of features described in the exemplary embodiments of the present invention are necessary to solutions for the aspects of the present invention.

First Exemplary Embodiment

According to the present exemplary embodiment, descriptions will be given of processing to avoid redundant connections where apparatuses previously connected to each other by a particular network connection method are connected to each other in a different network.

Figure 1:
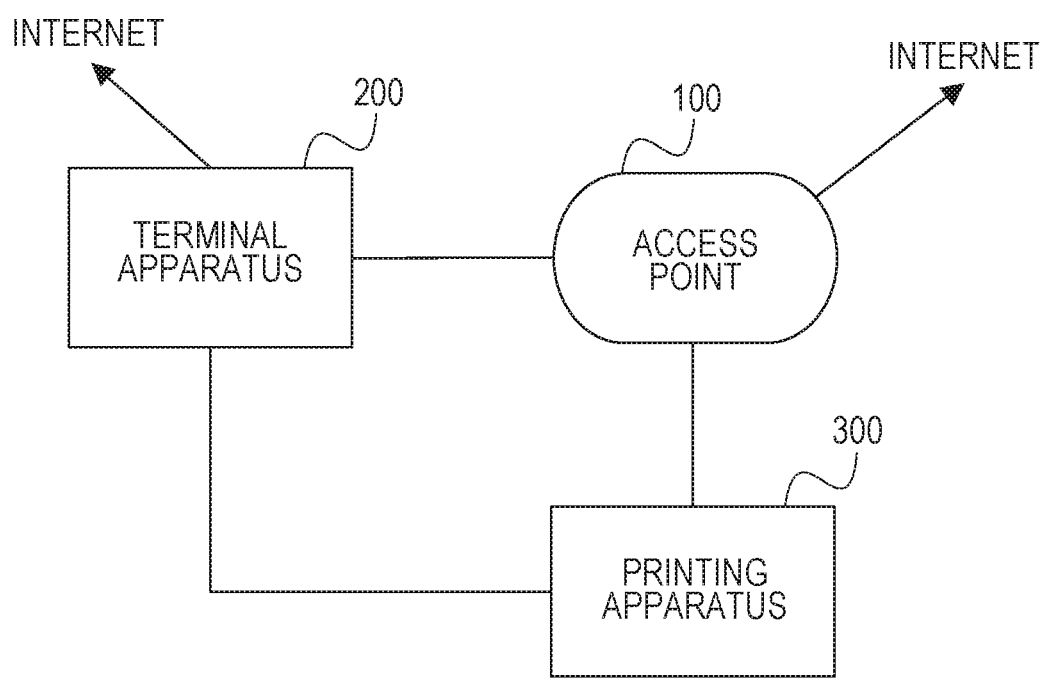
FIG. 1 illustrates a configuration of a print processing system.

FIG. 1 illustrates a configuration of a print processing system. This system includes an access point 100 as a central constituent, a portable terminal apparatus 200, and a printing apparatus 300, where the portable terminal apparatus 200 and the printing apparatus 300 can be connected to the access point 100. The terminal apparatus 200 is a communication apparatus that can communicate with other devices. Any type of apparatus may be used as the terminal apparatus 200 as long as the apparatus is able to support a printing target file. For example, including but not limited to a personal information terminal such as a personal digital assistant (PDA), a smart phone, a mobile phone, a personal computer, or a digital camera, etc.

The access point 100 can be connected to the Internet. The terminal apparatus 200 can also be connected to a mobile phone network that is connected to the Internet. The printing apparatus 300 is a device including a function of printing an image on a print medium using a printing engine, such as for example, an ink-jet printer. As will be described below, the printing apparatus 300 is able to communicate with other apparatuses. In addition, the printing apparatus 300 may include a reading function enabling reading an original placed on a platen glass of the printing apparatus 300, a facsimile function, or a telephone function.

The terminal apparatus 200 and the printing apparatus 300 can establish a wireless LAN connection in an infrastructure mode. In the infrastructure mode, the terminal apparatus 200 and the printing apparatus 300 can mutually perform a wireless communication via the external access point 100 or an access point unit 308 that will be described below. The access point unit 308 is included in the printing apparatus 300. The terminal apparatus 200 operates similarly when connected to the printing apparatus via the access point unit 308 as in a case where the terminal apparatus 200 is connected to the printing apparatus 300 via the access point 100. The terminal apparatus 200 and the printing apparatus 300 are connected to each other without the intermediation of the external access point 100.

The terminal apparatus 200 and the printing apparatus 300 both include a short-range wireless communication function and a P2P communication function (for example, a communication function based on Wi-Fi Direct®)., and the terminal apparatus 200 and the printing apparatus 300 are directly connected to each other on a peer-to-peer basis and can directly communicate with each other. In Wi-Fi Direct®, according to the present exemplary embodiment, the access point unit 308 may be used, or another software implemented access point included in the printing apparatus 300 may be used without using the access point unit 308.

The above-described short-range wireless communication refers to a wireless communication where a communication range is set as a predetermined relatively small range (for example, 1 meter to several centimeters), which is represented by Near Field Communication (NFC).

Figure 2:
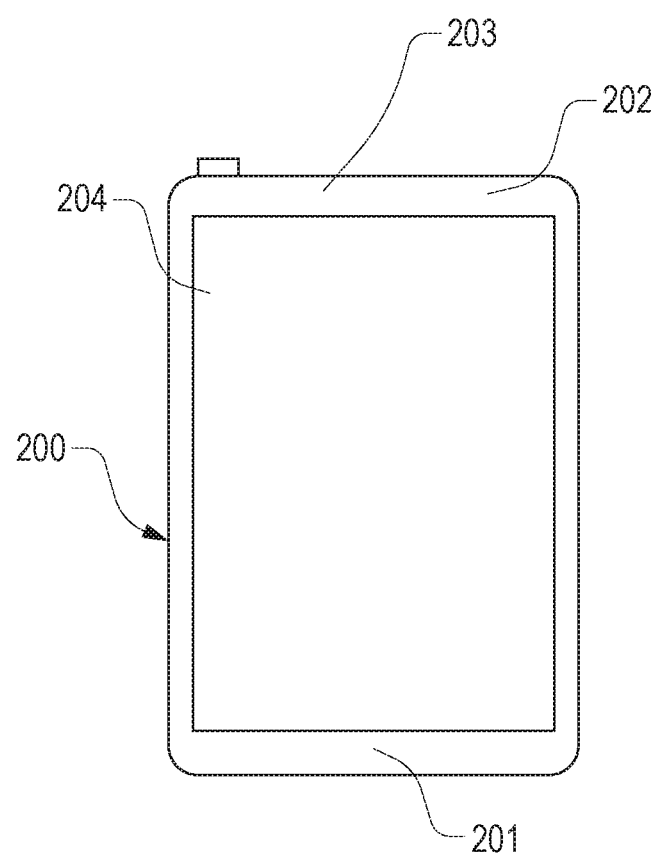
FIG. 2 illustrates a configuration of a terminal apparatus.

FIG. 2 illustrates a configuration of the terminal apparatus 200. According to the present exemplary embodiment, a smart phone is used as an example of the terminal apparatus 200. The smart phone refers to a multifunctional mobile phone provided with a camera, an Internet browser, an email function, and the like in addition to a function of a mobile phone. An NFC unit 201 is a unit configured to perform short-range wireless communication. When a user brings the NFC unit 201 close to an NFC unit at the other side (NFC unit of the printing apparatus 300 according to the present exemplary embodiment) within a predetermined distance (approximately 10 cm), communication can be performed.

A wireless LAN unit 202 is a unit configured to perform a communication by way of a wireless LAN and is arranged in the terminal apparatus 200. A line connection unit 203 is a unit configured to perform an Internet communication via the mobile phone network and is arranged in the terminal apparatus 200. The line connection unit 203 is connected to the Internet by using, for example, a communication standard such as Long Term Evolution (LTE). A panel unit 204 is, for example, a display provided with an LCD display mechanism. The panel unit 204 is provided with a touch panel system operation mechanism and detects a touch on the panel unit 204 by the user. Press information such as a position on the panel unit 204 and an intensity of the touch or a touched area is output to a CPU 225 that will be described below. An operation method using the touch panel includes a method in which user interfaces (UI) such as a button icon and a software keyboard on the panel unit 204 are displayed, and the user presses those UIs to issue events so that predetermined functions are executed.

Figure 3A:
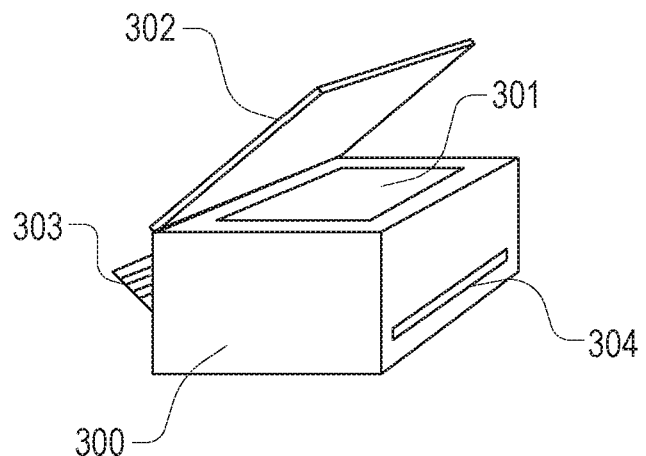
FIGS. 3A and 3B illustrate an outer appearance of a printing apparatus.
Figure 3B:
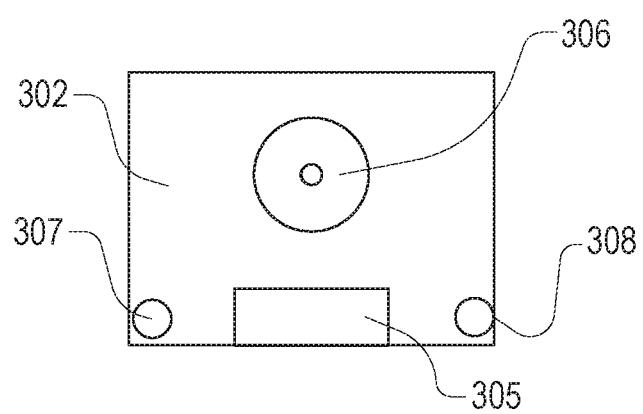

FIGS. 3A and 3B illustrate an outer appearance of the printing apparatus 300. According to the present exemplary embodiment, a multi-function printer (MFP) having a reading function (scanner) in addition to the above-described printing function is used as an example of the printing apparatus 300. In FIG. 3A, a platen glass 301 is a transparent table made of glass and is used when an original is placed thereon to be read by a scanner. An original cover 302 is a cover for avoiding leakage of reading light to the outside when the scanner performs the reading. A print sheet insertion slot 303 is an insertion slot for setting sheets of various sizes. The sheets set in the print sheet insertion slot 303 are conveyed one-by-one to a printing unit and discharged from a print sheet discharging port 304 after the printing is performed.

In FIG. 3B, a panel unit 305 and a NFC unit 306 are arranged on an upper part of the original cover 302. The configuration of the panel unit 305 is similar to that of the panel unit 204 in the terminal apparatus 200. An operation method in the panel unit 204 includes a method in which user interfaces (UIs), such as a button icon and a software keyboard, are displayed on the panel unit 305 and the user presses the UIs. Events are issued based on the press of the UIs by the user, and the printing apparatus 300 executes predetermined functions in accordance with the issued events.

The NFC unit 306 is a unit configured to perform the short-range wireless communication when the user brings the terminal apparatus 200 close to the printing apparatus 300. A predetermined distance (approximately 10 cm) from the NFC unit 306 is a contact effective range.

An antenna for a communication by way of the wireless LAN is embedded in a wireless LAN unit 307. The access point unit 308 has a function of an access point for relaying the wireless LAN connection between the terminal apparatus 200 and the printing apparatus 300 similarly as in the access point 100 described above. The access point unit 308 is a unit built into the printing apparatus 300 for the printing apparatus 300 to communicate with other apparatuses.

Figure 4:
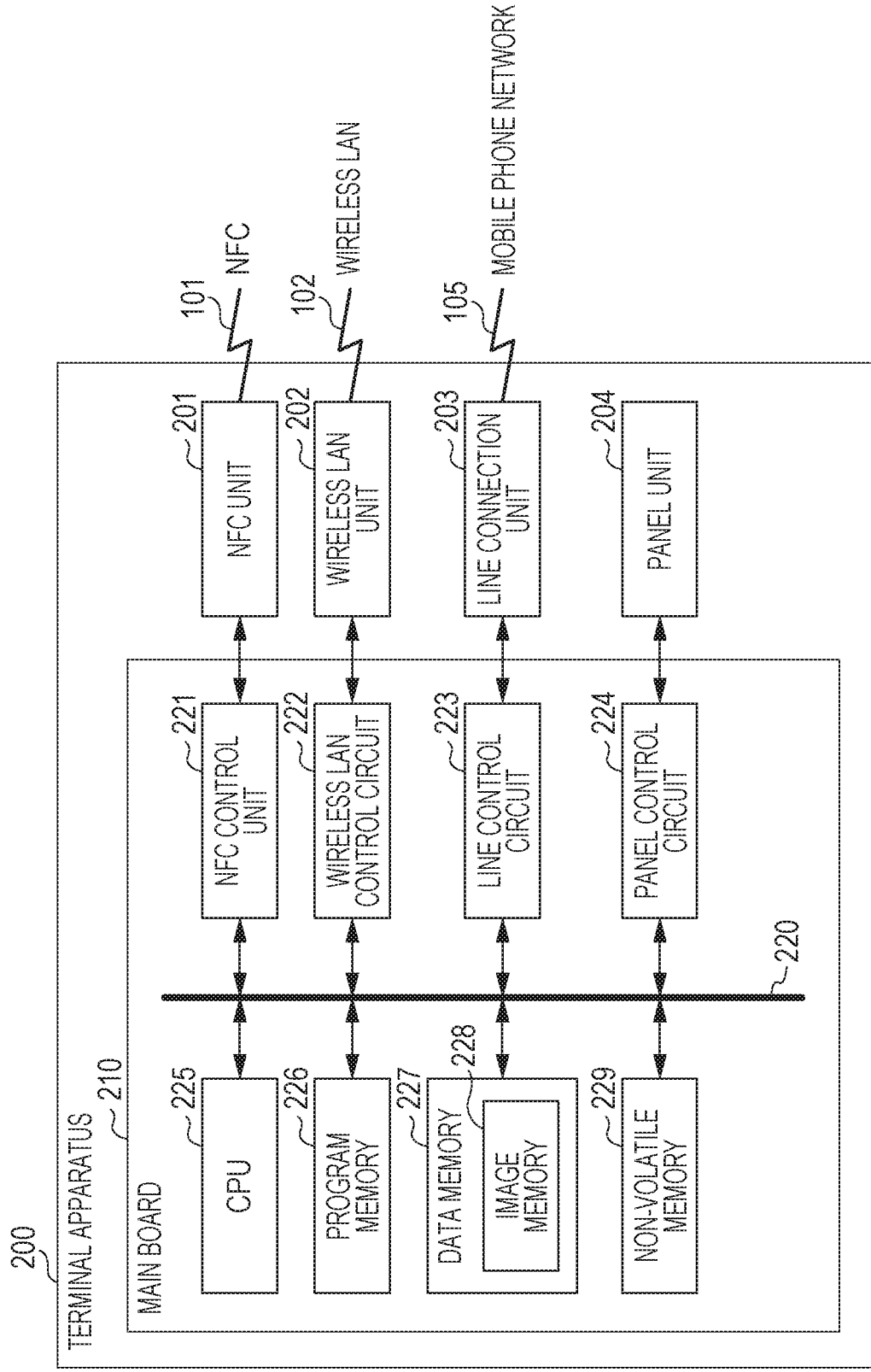
FIG. 4 is a block diagram illustrating the configuration of the terminal apparatus.

FIG. 4 is a block diagram illustrating a configuration of the terminal apparatus 200. The terminal apparatus 200 includes a main board 210 configured to control the entire terminal apparatus 200, the NFC unit 201, the wireless LAN unit 202, the line connection unit 203, and the panel unit 204. Herein, all of the NFC unit 201, the wireless LAN unit 202, and the line connection unit 203 function as a communication unit of the terminal apparatus 200.

The CPU 225 having a microprocessor configuration arranged in the main board 210 is operated in accordance with a control program stored in a program memory 226 having a ROM configuration connected via an internal bus 220 and a content of a data memory 227 having a RAM configuration. The CPU 225 controls the wireless LAN unit 202 via a wireless LAN control circuit 222 to communicate with other communication apparatuses by way of a wireless LAN 102. The wireless LAN control circuit 222 also includes a Wi-Fi Direct® function, and can perform a direct communication (e.g., P2P communication) between the terminal apparatus 200 and the printing apparatus 300.

The CPU 225 controls the NFC unit 201 via an NFC control circuit 221 to detect a connection based on the NFC to another NFC terminal and can perform transmission and reception of data with the other NFC terminal. The CPU 225 controls the line connection unit 203 via a line control circuit 223 to be connected to the mobile phone network 105 and can perform phone call and transmission and reception of data. The CPU 225 can perform display of the UI or the like on the panel unit 204 by controlling a panel control circuit 224. The CPU 225 also accepts press information output by the panel unit 204 and the panel control circuit 224 (information related to a touch on the panel unit 204 by the user) as a user operation and can perform control in accordance with the user operation.

A non-volatile memory 229 is a memory such as a flash memory and stores data desired to be saved even after a power supply is turned off. For example, the non-volatile memory 229 stores image data desired to be saved or a program such as application software for causing the terminal apparatus 200 to realize various function in addition to phonebook data, various communication connection information, information on previously connected devices, or the like.

The CPU 225 executes an operating system (OS) or application stored in the program memory 226 or the non-volatile memory 229 on the data memory 227. Accordingly, it is possible to perform various processings provided by the application. For example, the CPU 225 executes printing application for causing the printing apparatus 300 to execute processing such as printing, and an UI for the printing application is displayed on the panel unit 204 via the panel control circuit 224.

Figure 5:
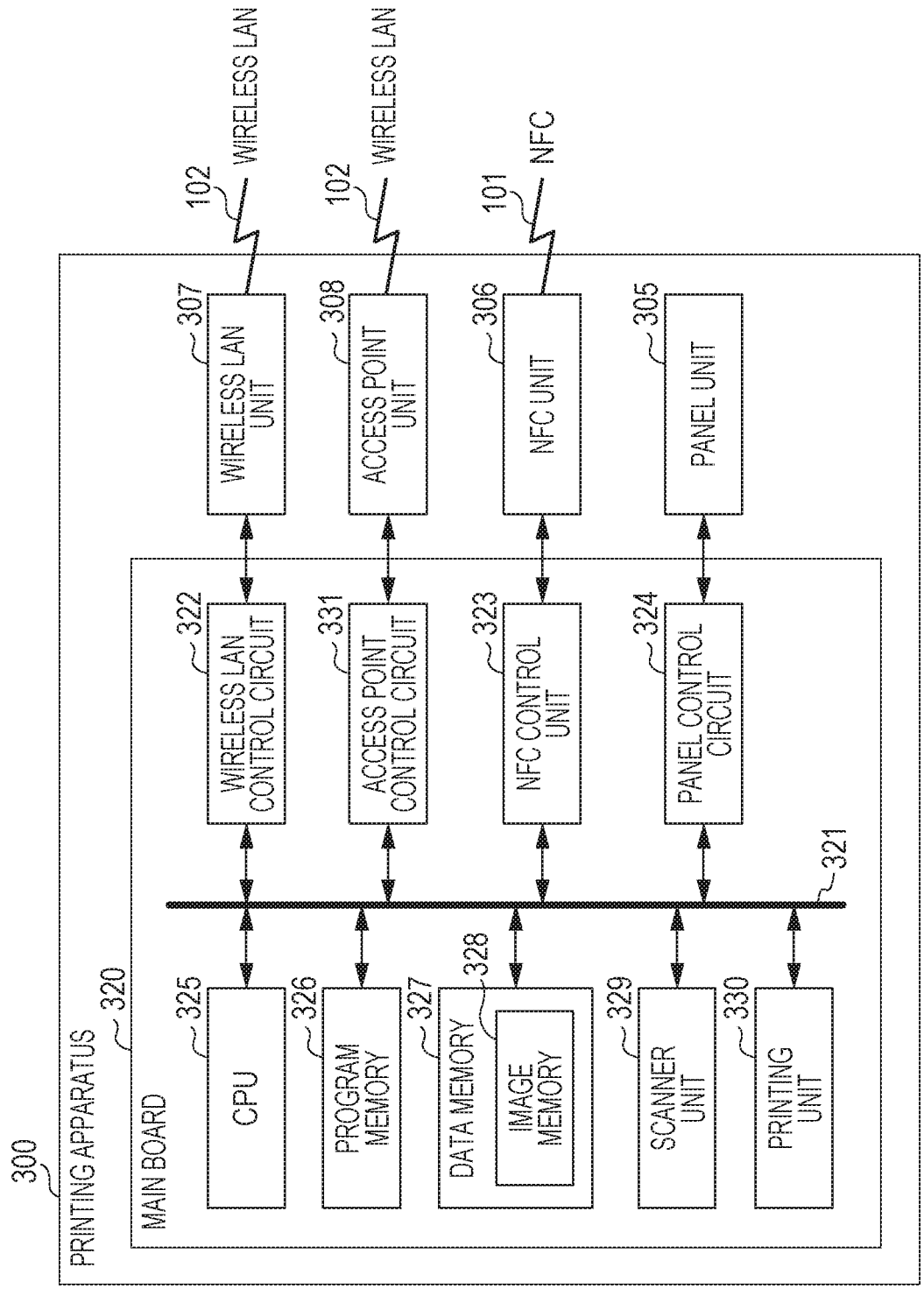
FIG. 5 is a block diagram illustrating the configuration of the printing apparatus.

FIG. 5 is a block diagram illustrating a configuration of the printing apparatus 300. The printing apparatus 300 includes a main board 320 configured to control the entire apparatus, the NFC unit 306, the wireless LAN unit 307, the access point unit 308, and the panel unit 305. Herein, the NFC unit 306 and the wireless LAN unit 307 function as a communication unit of the printing apparatus 300.

A CPU 325 having a microprocessor configuration arranged in the main board 320 is operated in accordance with a control program stored in a program memory 326 having a ROM configuration connected via an internal bus 321 and a content of a data memory 327 having a RAM configuration. An access point control circuit controls the access point unit 308. The CPU 325 controls a scanner unit 329 to read an original to be stored in an image memory 328 in the data memory 327. The CPU 325 also controls a printing unit 330 so that the image of the image memory 328 in the data memory 327 can be printed on a recording medium.

The CPU 325 controls the wireless LAN unit 307 through a wireless LAN control circuit 322 to perform a communication based on the wireless LAN 102 with another communication terminal apparatus. The wireless LAN control circuit 322 also includes the Wi-Fi Direct® function and can perform a direct communication (e.g., (P2P communication)) between the terminal apparatus 200 and the printing apparatus 300. The CPU 325 also controls the NFC unit 306 via an NFC control circuit 323 to detect a connection based on NFC 101 with another NFC terminal and can perform transmission and reception of data with the other NFC terminal.

When the OS or the application stored in the program memory 326 is executed on the data memory 327, the CPU 325 can perform various processings provided by the application. For example, when the CPU 325 executes the application, the CPU 325 performs status display of the printing apparatus 300 or display of a function selection menu on the panel unit 305 via a panel control circuit 324 by the function of the application. The CPU 225 can also accept an operation from the user by the application. For example, management application for managing the printing apparatus 300 which is stored in the program memory 326 is executed by the CPU 325, and a UI for the management application is displayed on the panel unit 305 via the panel control circuit 324.

Figure 6:
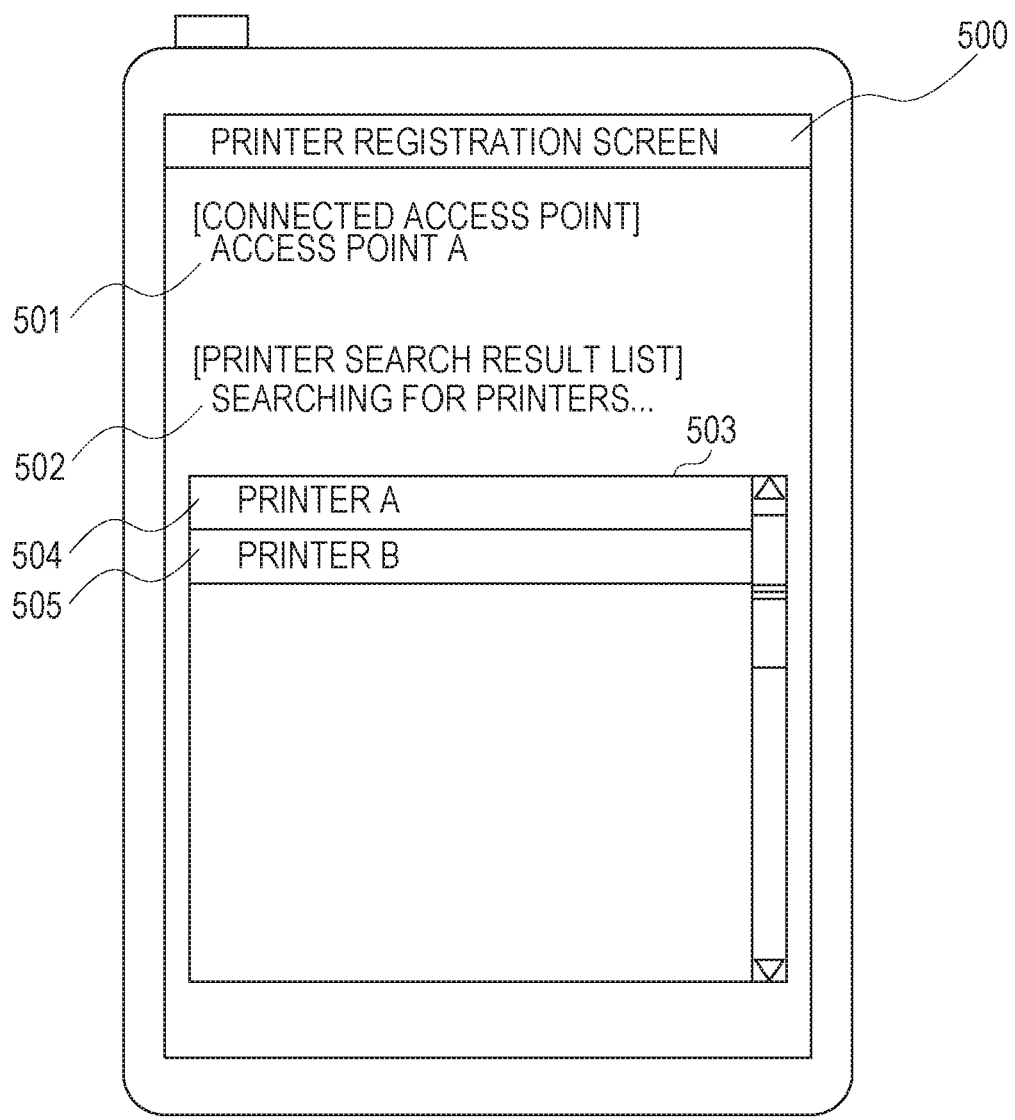
FIG. 6 illustrates a printer registration screen of printing application according to a first exemplary embodiment.

FIG. 6 illustrates a printer registration screen 500 from among screens displayed when the CPU 225 of the terminal apparatus 200 executes the printing application. The printing application can hold identification information for identifying the printing apparatus 300, such as at least one of the MAC addresses or printing apparatus information including a performance of the printing apparatus 300 such as a printable sheet type list. The identification information and the printing apparatus information are stored in the program memory 226 or the non-volatile memory 229 while the user executes the printing application and performs printer registration processing. A printer where the above-described registration processing is executed will be referred to as a registered printer.

The registered printer is determined while the user specifies the printer on the printer registration screen 500. On the printer registration screen 500, an access point name 501 displays set service identifiers (SSIDs) of currently connected access points. A message 502 displays a message for clarifying currently executed processing on the screen. According to the present exemplary embodiment, when a registration screen is displayed in the printing application, printer search is automatically started. When the printer search is executed, the message 502 displays a message indicating that the search is being executed. When the search is ended, a message indicating the search completion is displayed. A result of the printer search is displayed on a search result list 503.

A different network connection method can be searched for in the printer search. The printer search is performed by the different network connection method, and a result thereof is merged to be displayed on the search result list 503. Specifically, according to the present exemplary embodiment, both a printer 504 (in the illustrated example, a printer A) searched for in the infrastructure mode and a printer 505 (in the illustrated example, a printer B) searched for in Wi-Fi Direct® are displayed. The infrastructure mode corresponds to a printer searched for via an access point displayed by the access point name 501 (in the illustrated example, an access point A).

Figure 7:
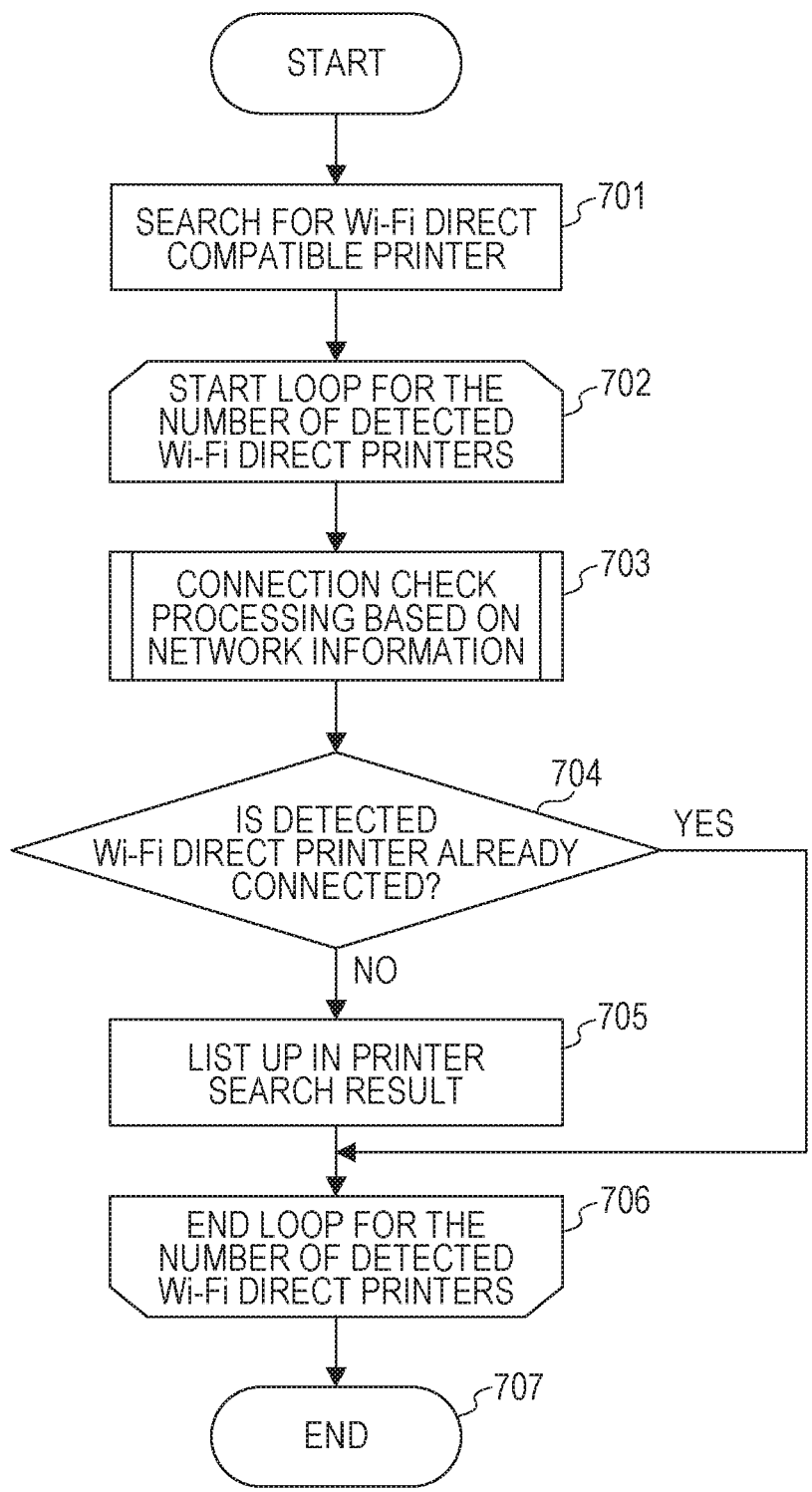
FIG. 7 illustrates search processing of Wi-Fi Direct® according to the first exemplary embodiment.

FIG. 7 is a flow chart of search processing for printers communicable in Wi-Fi Direct® in printer search processing executed on the printer registration screen 500. When the printer registration screen 500 is displayed, the search processing for the printers communicable in Wi-Fi Direct® is executed. The processing in the flow illustrated in FIG. 7 is realized while the CPU 225 of the terminal apparatus 200 executes the OS or the application stored in the program memory 226 or the non-volatile memory 229 by using the data memory 227 as the work memory.

In step 701, the CPU 225 searches for the printers communicable in Wi-Fi Direct®. In the search in step 701, for example, the CPU 225 uses the wireless LAN unit 202 to execute printing service and service discovery of Wi-Fi Direct® compatible devices. A device that has responded thereto is set as the printer communicable in Wi-Fi Direct®.

In step 701, when a list of Wi-Fi Direct® compatible printers is obtained, the processing shifts to step 702. In step 702 to step 705, the CPU 225 executes processing in step 703 to step 705 on each of the Wi-Fi Direct® compatible printers obtained in step 701.

In step 703, the CPU 225 checks whether the Wi-Fi Direct® compatible printer searched for in step 701 is already connected to the terminal apparatus 200 by a network connection method other than Wi-Fi Direct®. A detail of the processing in step 703 will be described below with reference to FIG. 8. In step 703, when the connection status of the printing apparatus is checked, in step 704, the CPU 225 determines as a result of the check result in step 703 whether the printing apparatus 300 is already connected by the network connection method other than Wi-Fi Direct®.

In step 704, when it is determined that the printing apparatus is not connected to the terminal apparatus 200 by the network connection method other than Wi-Fi Direct®, the processing shifts to step 705. With the processing in step 704, it is possible to identify the printing apparatus that is communicable in Wi-Fi Direct® and is also already connected to the terminal apparatus 200 via its own access point unit. In step 705, the CPU 225 adds the Wi-Fi Direct® compatible printer to the printer search list. Since the printer is added, this printer is displayed on the search result list 503.

On the other hand, in step 704, when it is determined that the printing apparatus is already connected to the terminal apparatus 200 by the network connection method other than Wi-Fi Direct®, the CPU 225 does not add this printer to the search result list 503 and shifts the processing to step 706. When the processing is shifted to step 706, in a case where the printer where the processing in step 703 to step 705 is not executed exists from among the printers searched for in step 701, the processing is shifted to step 703. When the connection check processing is performed on all the Wi-Fi Direct® compatible printers searched for in step 701, the search processing ends in step 707.

With the processing illustrated in FIG. 7, it is possible to identify the printing apparatus that is already connected to the terminal apparatus 200 via the access point connected by the terminal apparatus 200 from among the printing apparatuses communicable in Wi-Fi Direct®. Subsequently, the display of the thus identified printing apparatus on the search result list 503 can be avoided. For this reason, it is possible to avoid double connections in which the user selects the printing apparatus on the search result list 503 to be connected by Wi-Fi Direct® although the printing apparatus is already connected to the terminal apparatus 200 by the connection method other than Wi-Fi Direct®.

On the other hand, the printing apparatus that is not connected to the terminal apparatus 200 via the access point connected by the terminal apparatus 200 from among the printing apparatuses communicable in Wi-Fi Direct® is displayed on the search result list 503. For this reason, even in a case where the terminal apparatus 200 is connected to a certain printing apparatus via an access point, the terminal apparatus 200 can be connected by Wi-Fi Direct® to the printing apparatus that is not connected to the terminal apparatus 200 via the access point.

Figure 8:
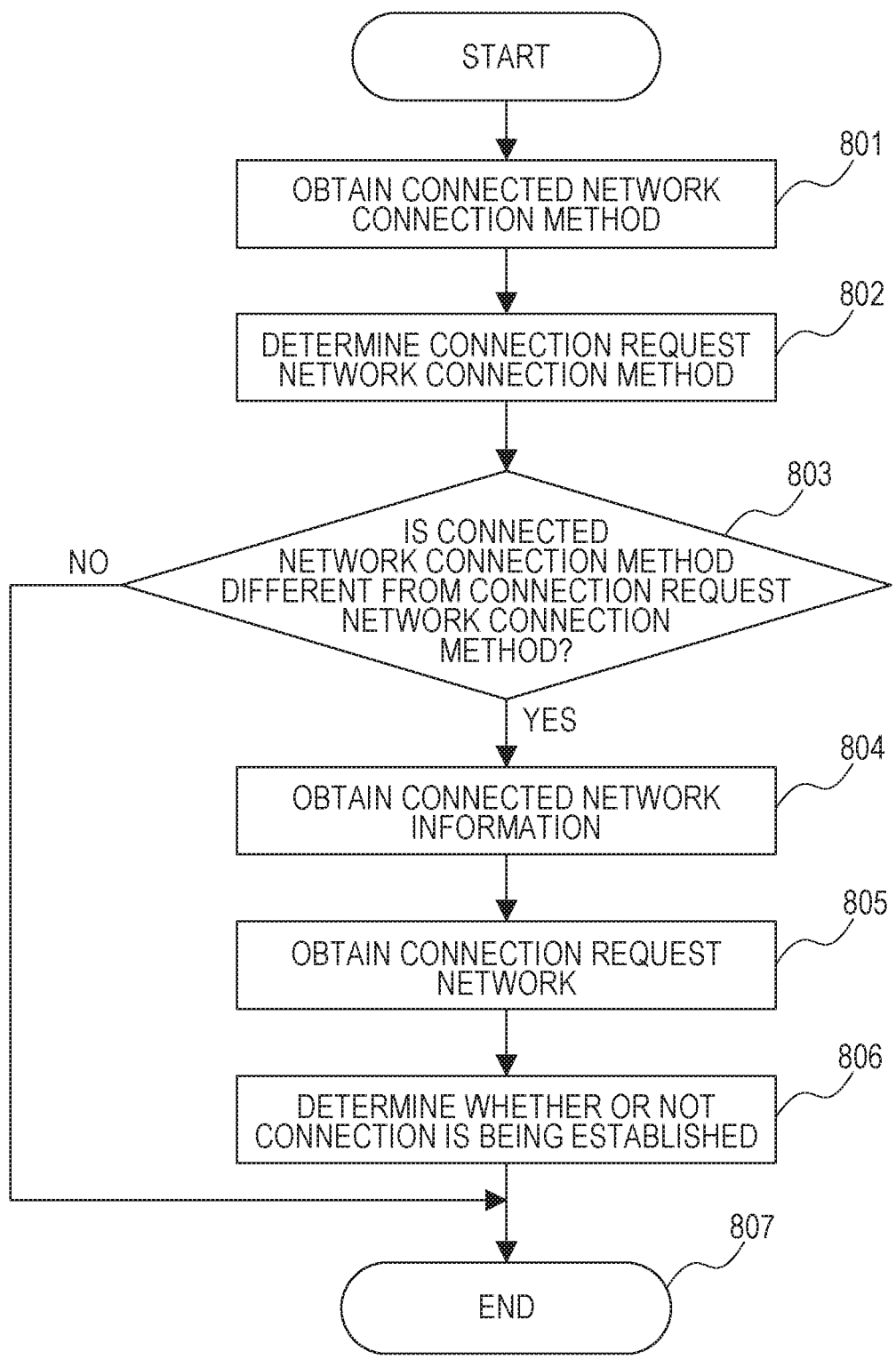
FIG. 8 illustrates connection check processing according to the first exemplary embodiment.

FIG. 8 is a connection check processing flow according to the present exemplary embodiment. The processing illustrated in FIG. 8 is a detail of step 703 in FIG. 7.

In step 801, the CPU 225 obtains a network connection method by which the terminal apparatus 200 is currently connected. According to the present exemplary embodiment, an example is illustrated in which the terminal apparatus 200 is connected to the access point 100, and the mode in step 801 is the infrastructure mode corresponding to the network connection method via the access point.

When the network connection method by which the terminal apparatus 200 is currently connected is obtained in step 801, the CPU 225 obtains a network connection method by which the terminal apparatus 200 requests a connection in step 802. According to the present exemplary embodiment, since the search processing for the Wi-Fi Direct® compatible printers is being performed, the network connection method for the connection request is Wi-Fi Direct®. When the network connection method for the connection request is obtained, the processing is shifted to step 803. In step 803, the CPU 225 compares the network connection method obtained in step 801 and step 802 with each other. As a result of the comparison in step 803, in a case where the network connection methods obtained in step 801 and step 802 are the same, the CPU 225 shifts the processing to step 807 and ends the processing in FIG. 8.

The processing in FIG. 8 is executed not only in a case where the printers communicable in Wi-Fi Direct® are searched for as illustrated in FIG. 7, but also in a case where printers communicable in the infrastructure mode are searched for. In this case, in step 802, since the infrastructure mode is obtained as the network connection method for the connection request, it is determined in step 803 that the network connection methods obtained in step 801 and step 802 are the same. For this reason, the processing in step 804 to step 806 in FIG. 8 is not executed in this case, and the processing in FIG. 8 is ended.

In a case where the flow of FIG. 8 is executed in step 703 in FIG. 7, the infrastructure mode is obtained in step 801, and Wi-Fi Direct® is obtained in step 802 as described above. For this reason, the processing is shifted to step 804 as a result of the processing in step 803 in this case.

In step 804, the CPU 225 obtains network information of a network to which terminal apparatus 200 is currently connected. According to the present exemplary embodiment, the CPU 225 obtains a basic service set identifier (BSSID) as access point information related to an access point as the network information. The BSSID is one of network identifiers and is generally the same as a MAC address of an access point in a network. The BSSID according to the present exemplary embodiment is the same as a MAC address of the access point A displayed by the access point name 501. The BSSID is employed according to the present exemplary embodiment, but the configuration is not limited to this. For example, a broadcast MAC address as the currently connected network information may be employed. In this case, a state refers to the connection via the access point unit 308 or the connection via the access point 100 is established.

When the CPU 225 obtains the currently connected network information in step 804, the CPU 225 obtains the network information of the network connection method for the connection request in step 805. According to the present exemplary embodiment, the CPU 225 obtains a MAC address of a group owner and a MAC address of a client when the connection is established by Wi-Fi Direct®. An obtaining method for the network information in step 805 includes, for example, a method of obtaining the network information from the NFC unit 306 of the printing apparatus 300 by the NFC unit 201 of the terminal apparatus 200. In addition, the network information may be obtained via the wireless LAN unit 202 of the access point to which the terminal apparatus 200 is currently connected, or the network information may be obtained by Wi-Fi Direct®.

As described above, the MAC address obtained in step 804 is the same as the BSSID of the access point. For this reason, if this access point is the access point unit 308 built into the printing apparatus 300, this MAC address is a MAC address of the printing apparatus 300. Therefore, in a case where the access point to which the terminal apparatus 200 is currently connected is the access point unit 308 built into the printing apparatus 300, the MAC address obtained in step 804 is matched with the MAC address obtained in step 805.

When the CPU 225 obtains the connection request network information in step 805, the CPU 225 then shifts the processing to step 806 and compares the network information respectively obtained in step 805 and step 806 with each other in step 806. Accordingly, the CPU 225 can determine whether the terminal apparatus 200 and the printing apparatus 300 are being connected to each other in step 806. Specifically, the CPU 225 determines whether the MAC address as the identification information for identifying the printing apparatus and the BSSID as the access point information related to the currently connected access point satisfy a predetermined condition in step 806. For example, it is checked whether the BSSID of the currently connected network information obtained in step 804 is included in the list of the MAC addresses corresponding to the connection request network information obtained in step 805.

In a case where the BSSID obtained in step 804 is included in the above-described list, the CPU 225 determines that the access point that obtains this BSSID is the access point built into the printer that obtains the MAC address in step 805. That is, the CPU 225 can determine that the direct connection to the terminal apparatus 200 via the access point unit 308 of the printing apparatus 300 is established in this case.

In a case where the BSSID obtained in step 804 is not included in the above-described list, the CPU 225 determines that the access point that obtains this BSSID is not the access point build in the printer that obtains the MAC address in step 805. For example, the above-described determination result is obtained in a case where the terminal apparatus 200 is connected to the access point 100 outside the terminal apparatus 200 and the printing apparatus 300.

In step 806, furthermore, after the above-described determination processing, the CPU 225 saves the determination result in the non-volatile memory 229 and ends the connection check processing flow in FIG. 8. In step 704 described above, when the CPU 225 refers to the determination result saved in the non-volatile memory 229, it is possible to determine whether a printer corresponding to a candidate of the Wi-Fi Direct® connection target is already connected in the infrastructure mode.

According to the present exemplary embodiment, in a case where the terminal apparatus 200 is currently connected to the printing apparatus 300 by a certain connection method (for example, the infrastructure mode), the apparatus is not displayed on the printer search result list as a candidate to be communicated by another network system (for example, Wi-Fi Direct®). Accordingly, the double connections based on the other network connection system in addition to the currently connected network connection method can be avoided in advance.

In addition, according to the present exemplary embodiment, the case has been illustrated where the network information (BSSID) of the access point to which the terminal apparatus 200 is currently connected is obtained. Moreover, for example, a method is also conceivable in which broadcast is performed with respect to the currently connected network, and a MAC address list of connected devices obtained as a result of the broadcast is obtained. Further access to the connected device via the access point is not needed in the case of the method of obtaining the network information (BSSID) of the access point. Thus, the terminal apparatus 200 can perform the connection check processing at an even higher speed.

According to the present exemplary embodiment, the infrastructure mode of Wi-Fi® is set as the currently connected network connection method, and Wi-Fi Direct® is set as the different network connection method, but the configuration is not limited to this. For example, Bluetooth® may be employed instead of Wi-Fi Direct®.

In addition, according to the above-described exemplary embodiment, the case has been illustrated where the BSSID as the access point information related to the access point provided to the printing apparatus is matched with the MAC address as the identification information for identifying the printing apparatus. However, the configuration is not limited to this and may include a case where either one of the information includes the other information. For example, the configuration includes a case where the MAC address of the printing apparatus is included as part of the above-described BSSID. In this case, in step 806, it is determined whether the MAC address of the printing apparatus is included in the BSSID. On the other hand, if the BSSID is created by part of the MAC address of the printing apparatus, in step 806, it is determined whether the BSSID is included in the MAC address of the printing apparatus.

Second Exemplary Embodiment

According to the first exemplary embodiment, the descriptions have been given of the processing of avoiding the redundant connections between the terminal apparatus 200 and the printing apparatus 300 in advance. According to a second exemplary embodiment, an exemplary embodiment will be described in which the redundant connections are eliminated in a case where the terminal apparatus 200 and the printing apparatus 300 are already connected to each other by a plurality of different network connection methods (redundant connection state). Descriptions of the same processing as that of the first exemplary embodiment will be omitted.

Figure 9:
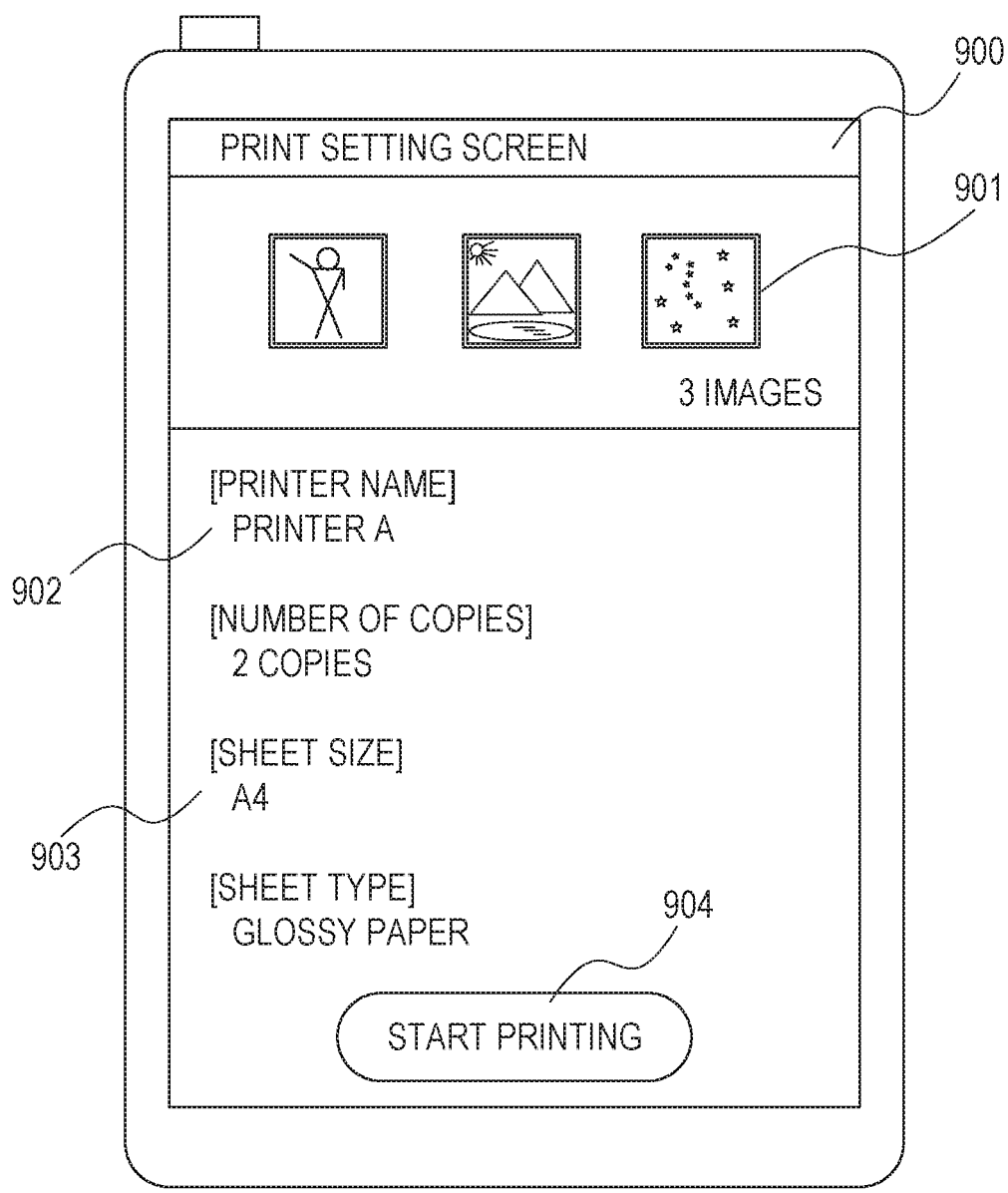
FIG. 9 illustrates a print setting screen of the printing application according to a second exemplary embodiment.

FIG. 9 illustrates a print setting screen 900 from among display screens that can be provided by the printing application executed by the CPU 225. The printing application can hold the identification information for identifying at least one of the printing apparatuses and the printing apparatus information such as the performance of the printing apparatus. A printer in which the identification information and the printing apparatus information are held will be referred to as a registered printer. A printer name of the printing apparatus information of a printer (current printer) from among the registered printers corresponding to a target where various functions of the printing application are executed is displayed on a printer name display area 902 on the screen illustrated in FIG. 9. Furthermore, a printing condition at the time of executing the printing is displayed on a printing condition display area 903 in accordance with the printing apparatus information of the registered printer. In addition, a thumbnail of the printing target image is displayed on a thumbnail display area 901.

The CPU 225 displays images in the non-volatile memory 229 on the panel unit 204 in a list format, and the user selects an image to be printed on the panel unit 204 to determine a printing target image (not illustrated). When the user selects a printing start button 904 via the panel unit 204, the CPU 225 executes the printing application and instructs the current printer (the printer A according to the present exemplary embodiment) to execute the printing. Specifically, the image corresponding to the thumbnail displayed on the thumbnail display area 901 is read out from the non-volatile memory 229 and transmitted to the current printer together with a printing condition displayed on a printing condition display area. Accordingly, the read image is printed in accordance with this printing condition.

Figure 10:
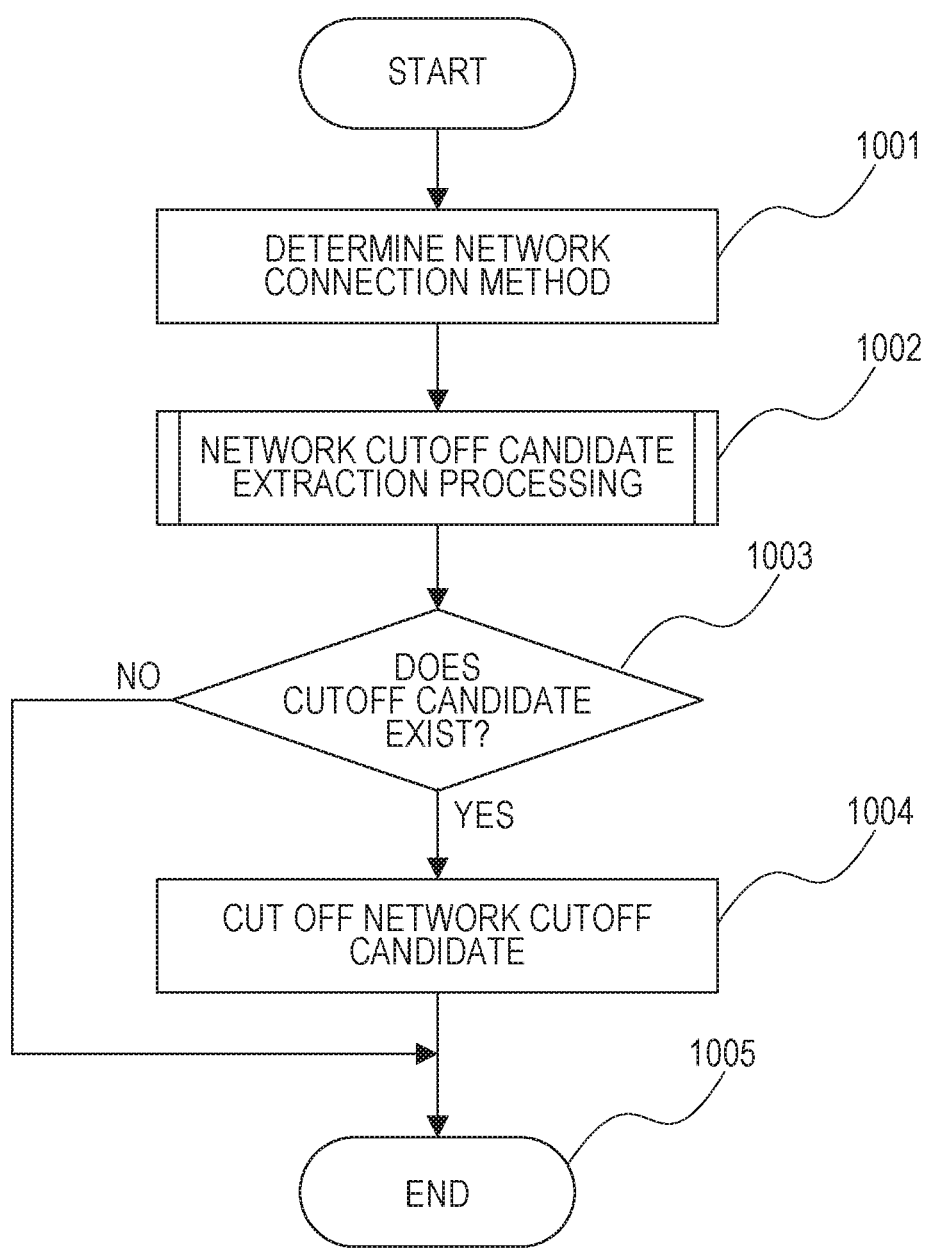
FIG. 10 illustrates redundant connection elimination processing according to the second exemplary embodiment.

FIG. 10 illustrates redundant connection elimination processing. The processing illustrated in FIG. 10 is executed in a case where the printing start button 904 in FIG. 9 is pressed to instruct the printing. It should be noted that the processing in the flow illustrated in FIG. 10 is realized while the CPU 225 of the terminal apparatus 200 executes the OS or the application stored in the program memory 226 or the non-volatile memory 229 by using the data memory 227 as the work memory similarly as in the processing of FIG. 7.

Figure 12:
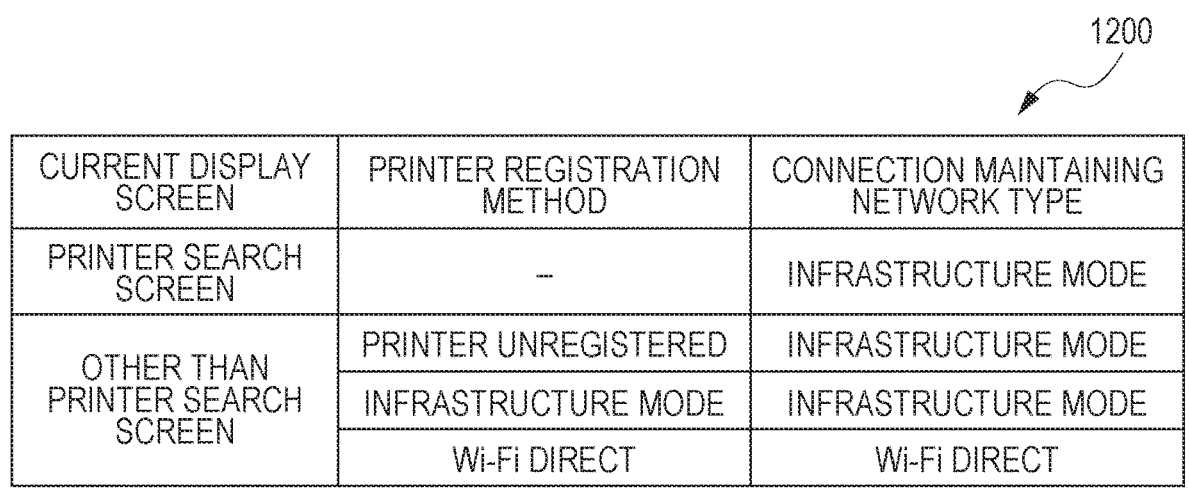
FIG. 12 illustrates a network connection method determination table according to the second exemplary embodiment.

In step 1001, the CPU 225 refers to a network connection method determination table to determine a network connection method with the current printer. FIG. 12 illustrates a network connection method determining table 1200 for determining the network connection method.

In the network connection method determining table 1200, a network connection method in which the connection is maintained is determined based on the display screen displayed by the printing application and the printer registration method. For example, in a case where the display screen displayed by the printing application is the printer search screen, it is set that the infrastructure mode is maintained, and the other network connection methods are cut off (discontinued).

A reason why the above-described setting is made in the network connection method determining table 1200 will be described. When a printer is registered in the printing application on the printer search screen, the CPU 225 searches for printers, and the user selects the printer to be registered by the user from the search result.

In Wi-Fi Direct®, a connection needs to be established with one particular device. However, in the case of the infrastructure mode, it is possible to search for a plurality of devices connected via an access point, and a connection does not need to be established to each of the plurality of devices. For this reason, according to the present exemplary embodiment, to find more printing apparatuses on the printer search screen, the infrastructure mode is maintained and Wi-Fi Direct® is set as a connection cutoff target.

In a case where Wi-Fi Direct® is registered at the time of the printer registration, if the Wi-Fi Direct® connection at the time of the registration is found by service recovery, it is possible to establish a connection to the printer more reliably than the infrastructure mode. Therefore, Wi-Fi Direct® may be maintained and the infrastructure mode may be set as a connection cutoff target.

In addition, in a case where the current display screen is a screen other than the printer search screen in the network connection method determining table 1200, a network type (connection method) in which the connection is maintained is set in accordance with the printer registration method. At the time of the printer registration described above, this printer registration method corresponds to the network connection method at the time of the registration, and this connection method is saved in the non-volatile memory 229 at the time of the printer registration (not illustrated). For example, the user may store the printer and the network connection method when the printer is registered while being associated with each other. For this reason, also in the print processing, the network connection method used at the time of the registration may be the connection method desired by the user. Thus, when the CPU 225 establishes the connection between the current printer and the terminal apparatus in the print processing, in order that the connection can be maintained while the network connection method at the time of the registration is prioritized, the printer registration method is referred to in the network connection method determining table 1200.

In step 1001, the network connection method in which the connection is maintained is determined by referring to the network connection method determining table 1200 described above in accordance with the current display screen and the printer registration method held in the non-volatile memory 229.

When the network connection method is determined in step 1001, the processing shifts to step 1002. In step 1002, the CPU 225 determines whether the printing apparatus 300 is connected to the terminal apparatus 200 by a network connection method other than the network connection method determined in step 1001 and extracts the network connection method. The CPU 225 sets the thus extracted network connection method as a network cutoff candidate. A detail of the processing in step 1002 will be described below with reference to FIG. 11.

When the extraction processing for the network cutoff candidate is executed in step 1002, the processing shifts to step 1003. In step 1003, the CPU 225 determines whether the network cutoff candidate exists. In a case where the network cutoff candidate does not exist, the present processing is ended in step 1005. On the other hand, in step 1003, when it is determined that the network cutoff candidate exists, the processing shifts to step 1004. In step 1004, the CPU 225 cuts off the network corresponding to the network cutoff candidate. When the CPU 225 cuts off the network, the present processing is ended in step 115.

Figure 11:
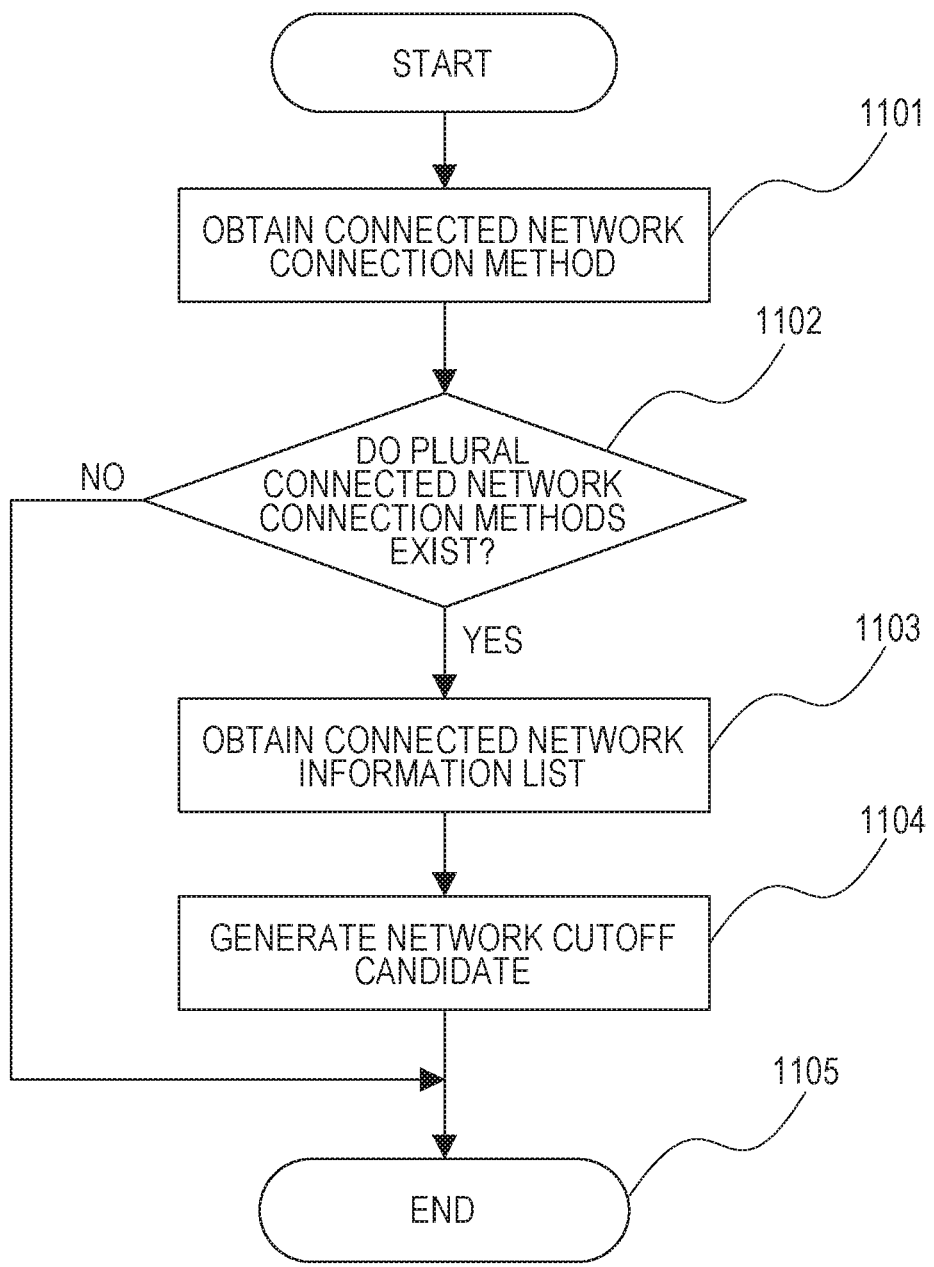
FIG. 11 illustrates network cutoff candidate extraction processing according to the second exemplary embodiment.

FIG. 11 illustrates network cutoff candidate extraction processing, illustrating a detail of the processing in step 1002.

In step 1101, the CPU 225 obtains all network connection methods by which the terminal apparatus 200 is being connected. According to the present exemplary embodiment, connections based on the infrastructure mode and Wi-Fi Direct® are established. When the network connection methods are obtained, the processing shifts to step 1102. In step 1102, the CPU 225 checks whether the number of network connection methods obtained in step 1101 is plural. In a case where the number of network connection methods is not plural, the present processing in step 1105 is ended. In a case where the number of the network connection methods obtained in step 1101 is plural, the processing shifts to step 1103. For example, in a case where the connections based on the infrastructure mode and Wi-Fi Direct® are established, the processing in step 1103 is executed.

In step 1103, the CPU 225 obtains the network information with regard to each of the currently connected network connection methods. According to the present exemplary embodiment, the CPU 225 obtains a basic service set identifier (BSSID) as the network information of the infrastructure mode. The CPU 225 also obtains a MAC address of a group owner and a MAC address of a client as the network information of Wi-Fi Direct®.

When the CPU 225 obtains the network information in step 1103, the processing shifts to step 1104. In step 1104, the CPU 225 compares the network information obtained in step 1103 with each other and determines whether the terminal apparatus 200 and the printing apparatus 300 are being connected to each other by a plurality of different network connection methods. As described above with regard to step 804 to step 806, the BSSID is generally the same as the MAC address of the access point of the network. For this reason, the CPU 225 compares the BSSID obtained in step 1103 with the MAC address as the network information of Wi-Fi Direct® and can determine whether the terminal apparatus 200 is being connected to the printing apparatus 300 by a plurality of different network connection methods. Specifically, in step 1004, the CPU 225 checks whether the BSSID of the infrastructure mode is included in the MAC address list corresponding to the network information of Wi-Fi Direct®.

In a case where the BSSID is included in the above-described MAC address list, the CPU 225 determines that the redundant connection state occurs. That is, it is determined that the terminal apparatus 200 is being connected to the printing apparatus 300 via the access point unit 308 of the printing apparatus 300 in the infrastructure mode. It is also determined that the wireless LAN unit 202 of the terminal apparatus 200 is being connected to the wireless LAN unit 307 of the printing apparatus by Wi-Fi Direct®.

In step 1004, the CPU 225 extracts the network connection method other than the network connection method determined in step 1001 with respect to the network connection method corresponding to the redundant connection state to be set as the network cutoff candidate. When the CPU 225 extracts the network cutoff candidate, the result is saved in the non-volatile memory 229, and the present processing is ended in step 1105. The CPU 225 checks whether the network cutoff candidate is saved in the non-volatile memory 229 in step 1003 described above. In step 1004, the connection based on the network connection method saved in the non-volatile memory 229 is cut off.

As illustrated in the present exemplary embodiment, only the necessary network connection methods in a case where the terminal apparatus 200 and the printing apparatus 300 are simultaneously connected to each other by the plurality of different network connection methods are maintained, and the other connections are cut off. Accordingly, the redundant connections between the terminal apparatus 200 and the printing apparatus 300 can be eliminated, and it is possible to avoid the communication instability and unwanted power consumption for the connection.

According to the present exemplary embodiment, the currently connected network connection method is set as the infrastructure mode of Wi-Fi® and Wi-Fi Direct® is set as the different network connection method, but the configuration is not limited to this. For example, Bluetooth® may be employed instead of Wi-Fi Direct®.

In addition, in step 1104, the network information of a pair of the network connection methods where it is determined that the redundant connections are established and the registration information of the current printer (for example, the MAC address) may be compared with each other, and the connection candidates may be set only in a case where the network information and the registration information are matched with each other. It is possible to eliminate only the redundant connection for the current printer connection by comparing with the network information of the current printer.

Third Exemplary Embodiment

According to the present exemplary embodiment, processing will be described in which information used for establishing a network connection between the terminal apparatus and the printing apparatus is transmitted and received via NFC, and handover processing of establishing the network connection is performed on the basis of information obtained by NFC. In the present processing, the redundant connections are avoided in which the already connected apparatuses by a particular network connection method are connected to each other in a plurality of different networks. Descriptions of the same processing as that of the first exemplary embodiment will be omitted.

Figure 13:
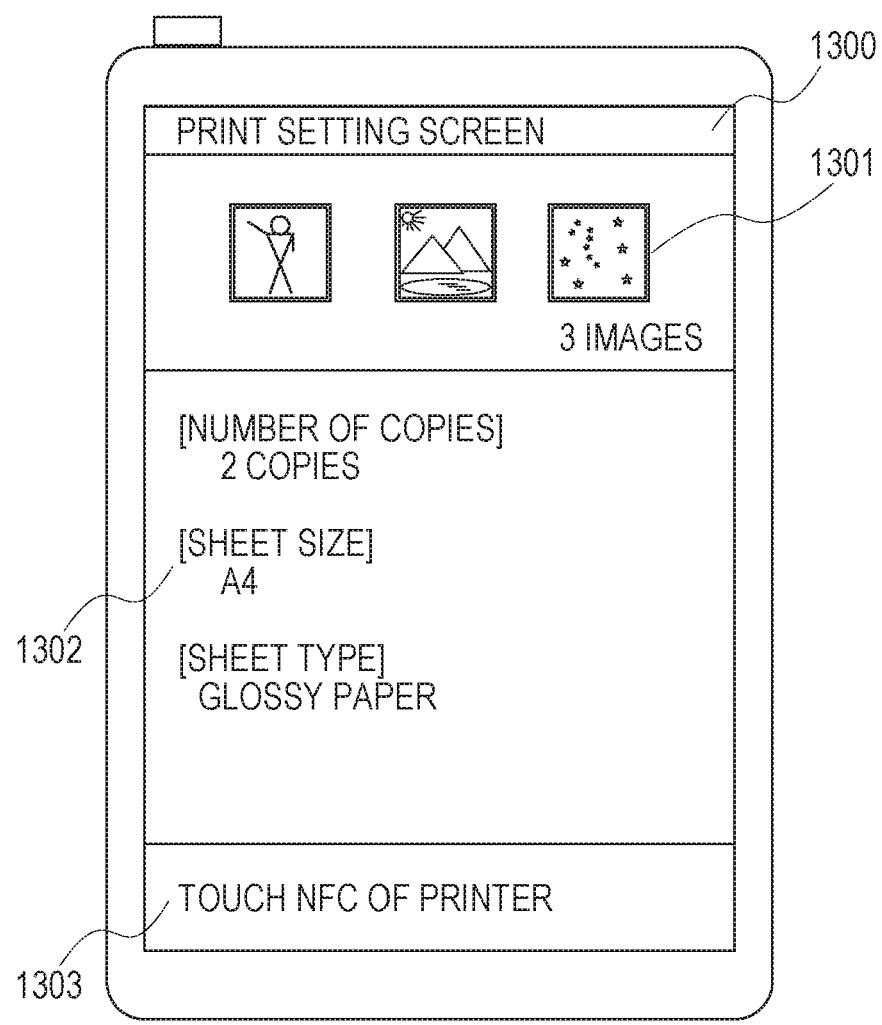
FIG. 13 illustrates a print setting screen of the printing application according to a third exemplary embodiment.

FIG. 13 illustrates a print setting screen 1300 from among screens that can be displayed while the CPU 225 executes the printing application. The thumbnail of the printing target image is displayed on a thumbnail display area 1301 on the print setting screen 1300. The printing condition at the time of the printing execution is displayed on a printing condition display area 1302. These display methods are similar to the display method described above with reference to FIG. 9.

The printing application guides the user to bring the NFC unit 201 of the terminal apparatus 200 close to the NFC unit 306 of the printing apparatus 300 by an NFC touch guidance message 1303. When the NFC units of the apparatuses are brought close to each other, the printing application obtains information used for the network connection based on Wi-Fi® from the NFC unit 306 of the printing apparatus 300 and establishes the network connection based on Wi-Fi® between the terminal apparatus 200 and the printing apparatus 300. The printing application instructs the printing apparatus 300 to print the image corresponding to the thumbnail under the printing condition displayed on the printing condition display area 1302 via the network connected by Wi-Fi®. This printing instruction is similar to the method described with reference to FIG. 9.

Figure 14:
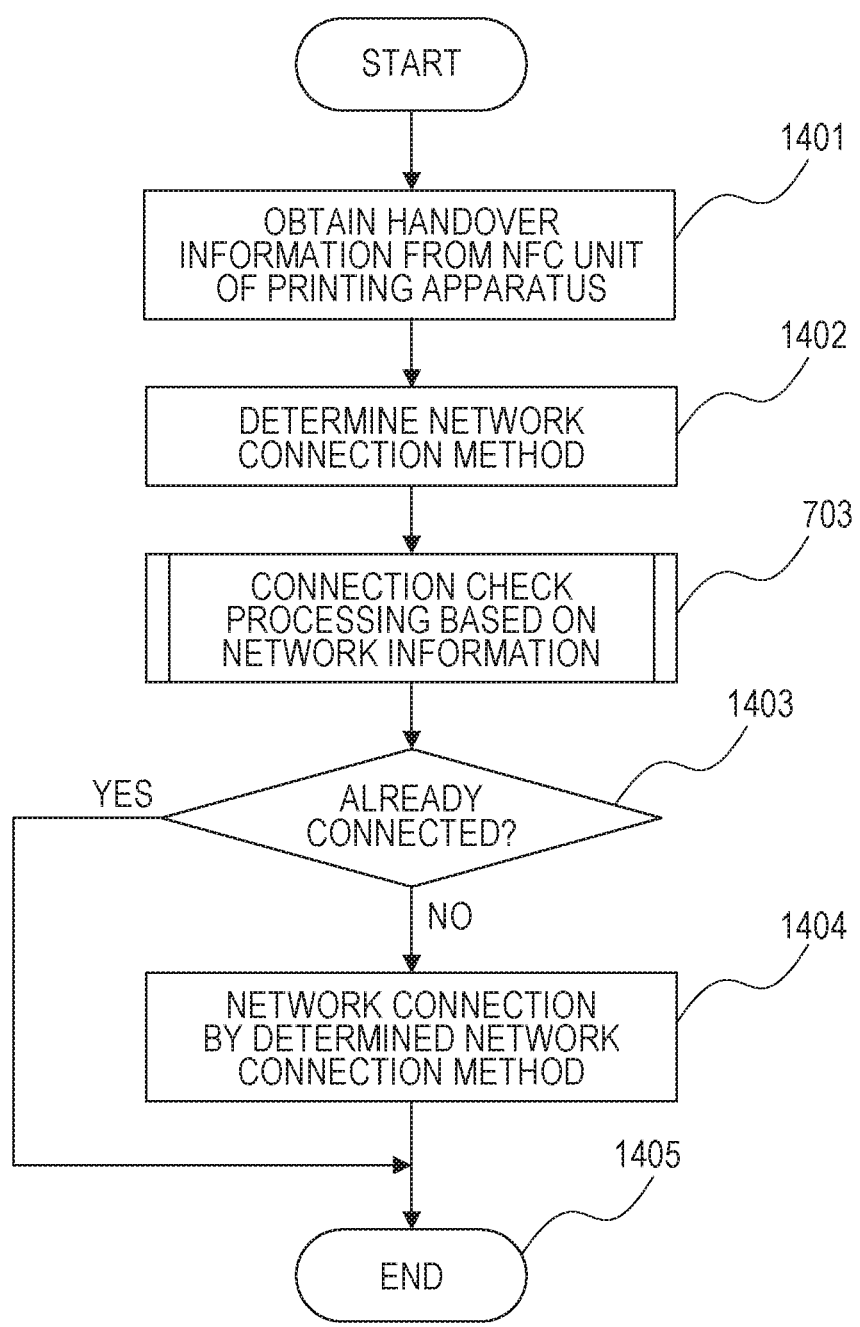
FIG. 14 illustrates handover processing according to the third exemplary embodiment.

FIG. 14 is a flow chart of the handover processing in the printing application. The processing in the flow illustrated in FIG. 14 is realized while the CPU 225 of the terminal apparatus 200 executes the OS or the application stored in the program memory 226 or the non-volatile memory 229 by using the data memory 227 as the work memory similarly as in the processing of FIG. 7 or FIG. 10.

In step 1401, the CPU 225 executes the printing application and obtains handover information for the handover processing from the NFC unit 306 of the printing apparatus 300 via the NFC unit 201. According to the present exemplary embodiment, the MAC address of the printing apparatus is included in the handover information. In addition, in step 1401, the network connection method by which the connection to the printing apparatus can be established and connection information for each network connection method are obtained by the NFC unit 201. The connection information includes a service set identifier (SSID) and a password of the access point unit 308 of the printing apparatus. When the handover information is obtained, the processing shifts to step 1402. In step 1402, the CPU 225 determines a connected network connection method based on the handover information obtained in step 1401.

According to the present exemplary embodiment, the printing apparatus 300 is put into a state in which connections based on the infrastructure mode via the access point unit 308 and the Wi-Fi Direct® mode via the wireless LAN unit 307 can be established. In addition, the terminal apparatus 200 can realize simultaneous connections by Wi-Fi Direct® and the mobile phone network via the line connection unit 203. That is, even when the terminal apparatus 200 is connected to the printing apparatus 300 by Wi-Fi Direct®, the terminal apparatus 200 can be connected to the Internet via the mobile phone network by the line connection unit 203. On the other hand, in a case where the terminal apparatus 200 is connected to the printing apparatus 300 in the infrastructure mode, the line connection unit 203 may not be utilized in some cases. For this reason, in step 1402, the CPU 225 determines Wi-Fi Direct® as the connected network connection method. When the CPU 225 determines the connected network connection method in step 1402, the processing shifts to step 703.

In step 703, the CPU 225 performs the processing similar to step 703 in FIG. 7 (FIG. 8). That is, it is checked whether the terminal apparatus and the printing apparatus are connected to each other by a network connection method different from Wi-Fi Direct® determined in step 1402. Specifically, the CPU 225 obtains a BSSID of the currently connected access point similarly as in the processing in step 804 and compares the BSSID with the MAC address of the printing apparatus obtained in step 1401. Accordingly, it is possible to check whether the connection to the printing apparatus where the NFC touch is performed is already established in the infrastructure mode via the access point unit provided to the printing apparatus. When the connection check processing is ended in step 703, the processing shifts to step 1403.

In step 1403, the CPU 225 determines whether the terminal apparatus and the printing apparatus are already connected to each other by a second connection method (infrastructure mode) which is different from a first connection method (Wi-Fi Direct®) determined in step 1402. In a case where the terminal apparatus 200 and the printing apparatus 300 are already connected to each other by the second connection method, the CPU 225 ends the present processing without performing the handover processing. In a case where the terminal apparatus 200 and the printing apparatus 300 are not already connected to each other by the second connection method, the processing shifts to step 1404. In step 1404, the CPU 225 performs the network connection by the network connection method (Wi-Fi Direct®) determined in step 1402 based on the handover information (MAC address of the printing apparatus). When the connection is completed, the present processing is ended in step 1405.

According to the present exemplary embodiment, for example, in a case where the terminal apparatus 200 and the printing apparatus 300 are already connected to each other via the access point unit provided to the printing apparatus 300 in the infrastructure mode, the handover processing to Wi-Fi Direct® is not performed. For this reason, it is possible to avoid the redundant connections based on the infrastructure mode and Wi-Fi Direct® between the terminal apparatus 200 and the printing apparatus 300.

Furthermore, the MAC address of the printing apparatus 300 obtained in step 1401 is used to determine whether the terminal apparatus 200 is already connected in the infrastructure mode in step 1403 and is also used for the handover in step 1404. For this reason, for example, when it is determined that the handover is performed (No in step 1403), the handover to Wi-Fi Direct® can be appropriately performed in step 1404 without performing the NFC touch again to obtain the handover information.

Fourth Exemplary Embodiment

The functions of the above-described exemplary embodiments can also be realized by the following configuration. That is, the functions are also realized by supplying a program code for performing the processing of the above-described exemplary embodiments to a system or an apparatus and executing the program code by a computer (or a CPU or an MPU) of the system or the apparatus. In this case, the program code itself read out from a storage medium realizes the functions of the above-described exemplary embodiments, and also the storage medium that stores the program code also realizes the functions of the above-described exemplary embodiments.

In addition, the configuration includes a case where the program code for realizing the functions of the above-described exemplary embodiments may be executed by a single computer (or a CPU or an MPU) and a case where the program code may be executed by a plurality of computers in cooperation with each other. Furthermore, the configuration includes a case where the program code may be executed by a computer, or hardware such as a circuit configured to realize the functions of the program code may be provided. As an alternative to the above, the configuration includes a case where part of the program code may be realized by hardware, and the remaining part may be realized by a computer.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-125883, filed Jun. 23, 2015, which is hereby incorporated by reference herein in its entirety.

What is claimed is:

1. A control method for a communication apparatus that communicates with a particular device that includes a predetermined access point and connects to the particular device using a first direct connection method where the communication apparatus is directly connected to the particular device on a peer-to-peer basis or a second direct connection method different from the first connection method where the communication apparatus is directly connected to the particular device by the predetermined access point included in the particular device, the control method comprising:

obtaining, from the particular device, first access point information identifying the predetermined access point included in the particular device;

displaying, on a display, a search result of a search by the communication apparatus for a device that can establish a connection based on the first direct connection method, based on the obtained first access point information and second access point information identifying an access point to which the communication apparatus is already connected; and executing a processing for connecting the communication apparatus with the particular device by the first direct connection method, in accordance with an instruction by a user on the display device, wherein, based on the obtained first access point information matching the second access point information, it is determined that the communication apparatus is connected to the particular device via the second direct connection method and simultaneous direct connection of the communication apparatus to the particular device via both the first direct connection method and the second direct connection method is avoided based on the display of the search result.

2. The control method according to claim 1, wherein the processing is executed such that a connection between the communication apparatus and the particular device using the first direct connection method is established based on that the obtained first access point information is different from the second access point information.

3. The control method according to claim 1, wherein the communication apparatus establishes a connection to the particular device based on the first direct connection method, in a case where a display item corresponding to the search result of the particular device is specified by the user on the display, and wherein the display item is displayed based on that the obtained first access point information is different from the second access point information.

4. The control method according to claim 1, wherein the first access point information is obtained from the particular device through a connection based on the second direct connection method or a third connection method.

5. The control method according to claim 1, wherein the first access point information is obtained from the particular device through a connection based on the first direct connection method.

6. The control method according to claim 1, wherein the first access point information is obtained from the particular device via short-range wireless communication.

7. The control method according to claim 6, wherein, in a case where the first access point information obtained by the short-range wireless communication unit does not match the second access point information, a connection between the communication apparatus and the particular device using the first direct connection method is established using the first access point information.

8. The control method according to claim 1, wherein the first direct connection method is a Wi-Fi Direct® connection and the second direct connection method is a wireless LAN connection via the predetermined access point.

9. The control method according to claim 8, wherein each of the first access point information and the second access point information is a basic service set identifier (BSSID).

10. The control method according to claim 1, wherein the particular device is a printing apparatus configured to print an image.

11. The control method according to claim 1, wherein the first access point information matches identification information of the particular device.

12. The control method according to claim 11, wherein each of the first access point information and the second access point information is a basic service set identifier (BSSID), and wherein the BSSID of the predetermined access point as the first access point information matches a MAC address of the particular device as the identification information.

13. The control method according to claim 1, wherein information related to the access point to which the communication apparatus is already connected is further displayed in the displaying.

14. The control method according to claim 1, wherein in a case where the obtained first access point information is different from the second access point information, a direct connection via the first direct connection method is established and a connection between the communication apparatus and the access point to which the communication apparatus is already connected, is continued.

15. The control method according to claim 1, further comprising, executing a discontinuing processing for discontinuing a direct connection using the first direct connection method or the second direct connection method, in a case where the communication apparatus is already connected to the particular device using the first direct connection method and the second direct connection method, based on the obtained first access point information and second access point information identifying an access point to which the communication apparatus is already connected, wherein, based on the obtained first access point information matching the second access point information, it is determined that the communication apparatus is connected to the particular device via the second direction connection method and the direct connection using the first direct connection method or the second direct connection method is discontinued.

16. The control method according to claim 15, wherein a connection method to be used for communicating with the particular device is registered.

17. The control method according to claim 16, in a case where the first direct connection method or the second connection method is registered and the communication apparatus is already connected to the particular device using the first direct connection method and the second direct connection method, the connection using the registered connection method is continued in a case where the discontinuing processing is executed.

18. The control method according to claim 17, where the particular device is a printing apparatus configured to print an image, and the discontinuing processing is executed in response to a print instruction by the user.

19. The control method according to claim 16, wherein a connection method used for registering the particular device is registered as the connection method to be used for communicating with the particular device.

20. The control method according to claim 19, wherein information related to performance of the particular device is stored in the communication apparatus, in the registering of the particular device.

21. The control method according to claim 1, wherein in the displaying, devices are searched based on the first direct connection method and the second direct connection method and the search result is displayed.

22. A communication apparatus that communicates with a particular device that includes a predetermined access point and connects to the particular device using a first direct connection method where the communication apparatus is directly connected to the particular device on a peer-to-peer basis or a second direct connection method different from the first connection method where the communication apparatus is directly connected to the particular device by the predetermined access point included in the particular device, the communication apparatus comprising:

an obtaining unit configured to obtain, from the particular device, first access point information identifying the predetermined access point included in the particular device;

a display unit configured to display, on a display device, a search result of a search by the communication apparatus for a device that can establish a connection based on the first direct connection method, based on the obtained first access point information and second access point information identifying an access point to which the communication apparatus is already connected; and an executing unit configured to execute processing for connecting the communication apparatus with the particular device by the first direct connection method in accordance with an instruction by a user on the display device, wherein, based on the obtained first access point information matching the second access point information, it is determined that the communication apparatus is connected to the particular device via the second direct connection method and simultaneous direct connection of the communication apparatus to the particular device via both the first direct connection method and the second direction connection method is avoided based on the display of the search result.

23. A non-transitory storage medium storing computer executable instructions for causing communication apparatus that communicates with a particular device that includes a predetermined access point and connects to the particular device using a first direct connection method where the communication apparatus is directly connected to the particular device on a peer-to-peer basis or a second direct connection method different from the first connection method where the communication apparatus is directly connected to the particular device by the predetermined access point included in the particular device to execute a method, the method comprising:

obtaining, from the particular device, first access point information identifying the predetermined access point included in the particular device; and displaying, on a display, a search result of a search by the communication apparatus for a device that can establish a connection based on the first direct connection method, based on the obtained first access point information and second access point information identifying an access point to which the communication apparatus is already connected; and executing a processing for connecting the communication apparatus with the particular device by the first direct connection method, in accordance with an instruction by a user on the display device, wherein, based on the obtained first access point information matching the second access point information, it is determined that the communication apparatus is connected to the particular device via the second direct connection method and simultaneous direct connection of the communication apparatus to the particular device via both the first direct connection method and the second direct connection method is avoided based on the display of the search result.

* * * * *